US008491057B2

(12) United States Patent
Demontis et al.

(10) Patent No.: US 8,491,057 B2
(45) Date of Patent: Jul. 23, 2013

(54) SUPPORT BODY OF A SEAT FOR VEHICLES

(75) Inventors: Salvatore Demontis, Orbassano (IT); Andrea Zussino, Orbassano (IT)

(73) Assignee: C.R.F. Societá Consortile per Azioni (IT)

( * ) Notice: Subject to any disclaimer, the term of this patent is extended or adjusted under 35 U.S.C. 154(b) by 192 days.

(21) Appl. No.: 13/000,616

(22) PCT Filed: Jun. 23, 2009

(86) PCT No.: PCT/EP2009/057767
§ 371 (c)(1),
(2), (4) Date: Mar. 28, 2011

(87) PCT Pub. No.: WO2009/156374
PCT Pub. Date: Dec. 30, 2009

(65) Prior Publication Data
US 2011/0169319 A1    Jul. 14, 2011

(30) Foreign Application Priority Data
Jun. 24, 2008   (EP) .................................... 08425441

(51) Int. Cl.
A47C 7/18     (2006.01)
A47C 7/24     (2006.01)
A47C 7/74     (2006.01)

(52) U.S. Cl.
USPC ............. 297/452.61; 297/180.13; 297/180.14

(58) Field of Classification Search
USPC .......................... 297/180.13, 180.14, 452.61
See application file for complete search history.

(56) References Cited

U.S. PATENT DOCUMENTS

| 4,276,666 | A | * | 7/1981 | Yamada ............................ 5/736 |
| 4,534,595 | A | * | 8/1985 | Abe et al. .................. 297/452.61 |
| 4,718,153 | A | * | 1/1988 | Armitage et al. .... 297/452.61 X |
| 4,867,508 | A | * | 9/1989 | Urai ...................... 297/452.61 X |
| 4,925,513 | A | * | 5/1990 | Witzke et al. ........ 297/452.61 X |
| 5,429,852 | A | * | 7/1995 | Quinn .................. 297/452.61 X |
| 5,460,873 | A | * | 10/1995 | Ogawa et al. ........ 297/452.61 X |
| 5,544,942 | A | * | 8/1996 | Vu Khac et al. ..... 297/452.61 X |
| 5,858,159 | A | * | 1/1999 | Holbrook et al. .... 297/452.61 X |
| 6,345,865 | B1 | * | 2/2002 | Ashida et al. ........ 297/452.61 X |

(Continued)

FOREIGN PATENT DOCUMENTS

DE    3617816 A1    10/1987
EP    1693189 A2    8/2006

(Continued)

OTHER PUBLICATIONS

"International Application Serial No. PCT/EP2009/057767 International Search Report and Written Opinion mailed Sep. 25, 2009", 9 pgs.

(Continued)

Primary Examiner — Rodney B White
(74) Attorney, Agent, or Firm — Schwegman Lundberg & Woessner, P.A.

(57) ABSTRACT

A seat body for vehicles has a padding made of plastic material foam and provided with through holes; the padding is covered by an upholstery covering having a fabric layer and a hygroscopic layer, which are heat-fixed together; the fabric layer defines a support surface for a user, while the material of the hygroscopic layer is an open-cell polyurethane foam having a cell mean linear density less than or equal to 15 cell/cm.

19 Claims, 3 Drawing Sheets

U.S. PATENT DOCUMENTS

| | | | |
|---|---|---|---|
| 6,620,488 B2 | 9/2003 | Oguri et al. | |
| 6,769,146 B2 * | 8/2004 | Copeland et al. | 297/452.61 X |
| 6,997,514 B2 * | 2/2006 | Tarantino et al. | 297/451.8 |
| 2004/0189061 A1 | 9/2004 | Hartwich et al. | |
| 2005/0248191 A1 * | 11/2005 | Azeau | 297/216.1 |
| 2007/0145808 A1 | 6/2007 | Minuth et al. | |

FOREIGN PATENT DOCUMENTS

| | | |
|---|---|---|
| FR | 2868368 | 10/2005 |
| FR | 2868368 A1 | 10/2005 |
| JP | 2000-107471 A | 4/2000 |
| JP | 2003-252946 A | 9/2003 |
| WO | WO-9639908 A | 12/1996 |
| WO | WO-2009156374 A1 | 12/2009 |

OTHER PUBLICATIONS

"International Application Serial No. PCT/EP2009/057767 Preliminary Report on Patentability mailed Sep. 9, 2010", 8 pgs.

"European Application Serial No. 09769223.0, Office Action mailed Mar. 19, 2012", 8 pgs.

Bicerano, J., et al., "Chapter 6—Flexible Polyurethane Foams", In: Polymeric Foams, CRC Press, LLC, (2004), 80 pgs.

Sen, A. K., "Chapter 7—Nonapparel Coating", In: Coated Textiles and Principles and Applications, Technomic Publishing Company, Inc. [online] [retrieved on Mar. 8, 2012]. Retrieved from the Internet: <URL: http://wwwv.crcnetbase.com/doi/pdfdirect/10.1201/9781420031928.ch7>, (2001), 26 pgs.

* cited by examiner

SUPPORT BODY OF A SEAT FOR VEHICLES

PRIORITY CLAIM AND RELATED APPLICATIONS

This application is a nationalization under 35 U.S.C. 371 of PCT/EP2009/057767, filed Jun. 23, 2009 and published as WO 2009/156374 A1 Dec. 30, 2009, which claimed priority under 35 U.S.C. 119 to European Patent Office Application No. 08425441.6, filed Jun. 24, 2008; which applications and publication are incorporated herein by reference in their entirety.

TECHNICAL FIELD

The present invention concerns a seat upholstery covering for vehicles.

BACKGROUND

To ensure high comfort from the viewpoint of the sensation of heat in areas of contact with the seat, the utilization of active heat-regulation systems is known, i.e. systems comprising a fan that is located beneath the squab and which feeds a flow of air from the passenger compartment towards the inside of the squab or in the opposite direction to increase heat exchange and thus the removal of heat.

Known solutions of the active type are not very satisfactory, as the sensation perceived by the user is not always positive.

In fact, when first using the seat, the user tends to perceive an immediate sensation of discomfort that becomes even more evident the higher is the initial heat exchange between body and seat. Due to the large and sudden removal of heat by the fan, the user perceives a sensation of excessive cooling when sitting on the seat, especially when perspiring heavily.

To resolve this drawback and consequently limit the initial heat exchange, it is preferable to adopt a "passive" solution, i.e. one without a fan, for which the user's initial sensation of the seat is essentially determined by the characteristics of the seat upholstery covering.

In this field of solutions, the need is felt to create a seat that is also effective from the heat exchange viewpoint in stationary conditions, where the sensation perceived by the user depends on the capability to dissipate both heat and humidity due to perspiration in an adequate and continuous manner. In the absence of a fan, this dissipation capability is a function of the characteristics of each component of the squab and the backrest, and of the particular combination and arrangement of the components themselves.

In the embodiments without fan, the seat upholstery covering is formed by an external fabric layer and an internal layer, made of a plastic material foam, which can not adequately dissipate the humidity due to perspiration and confer the desired comfort.

In order to reach such goals, U.S. patent application having publication number U.S. 2004189061 discloses a seat which has, under the fabric layer, an air-conditioning layer comprising a hygroscopic layer. The hygroscopic characteristics are conferred by active carbons in a base material, which is defined by a plastic material foam. The fabric layer preferably is not laminated, i.e. it is not heat-fixed to the below layer, because the lamination of the fabric layer would result in a severe reduction of the permeability. Such reduction would be basically due to the melted plastic material defining the joining between the inner surface of the fabric layer and the hygroscopic layer. Instead of lamination, patent application U.S. 2004189061 suggests therefore to fix the fabric layer to the below layer by sewing.

The need is felt to use a hygroscopic layer without active carbons and to heat-fix the fabric layer to such hygroscopic layer, for example by means of a flame process, without excessively losing the permeability characteristics of the seat upholstery covering.

OVERVIEW

One example of the present subject matter includes a seat upholstery covering for vehicles, which enables the above-mentioned needs to be met in a simple and economic manner.

According to an example of the present subject matter, a seat upholstery covering for vehicles is embodied as defined in claim 1.

According to an example of the present subject matter, a method is also provided to determine the distribution of a plurality of holes in the padding of a seat body, as defined in claim 13.

BRIEF DESCRIPTION OF THE DRAWINGS

The invention shall now be described with reference to the enclosed drawings, which illustrate a non-limitative embodiment, where.

DETAILED DESCRIPTION

Figure 1:
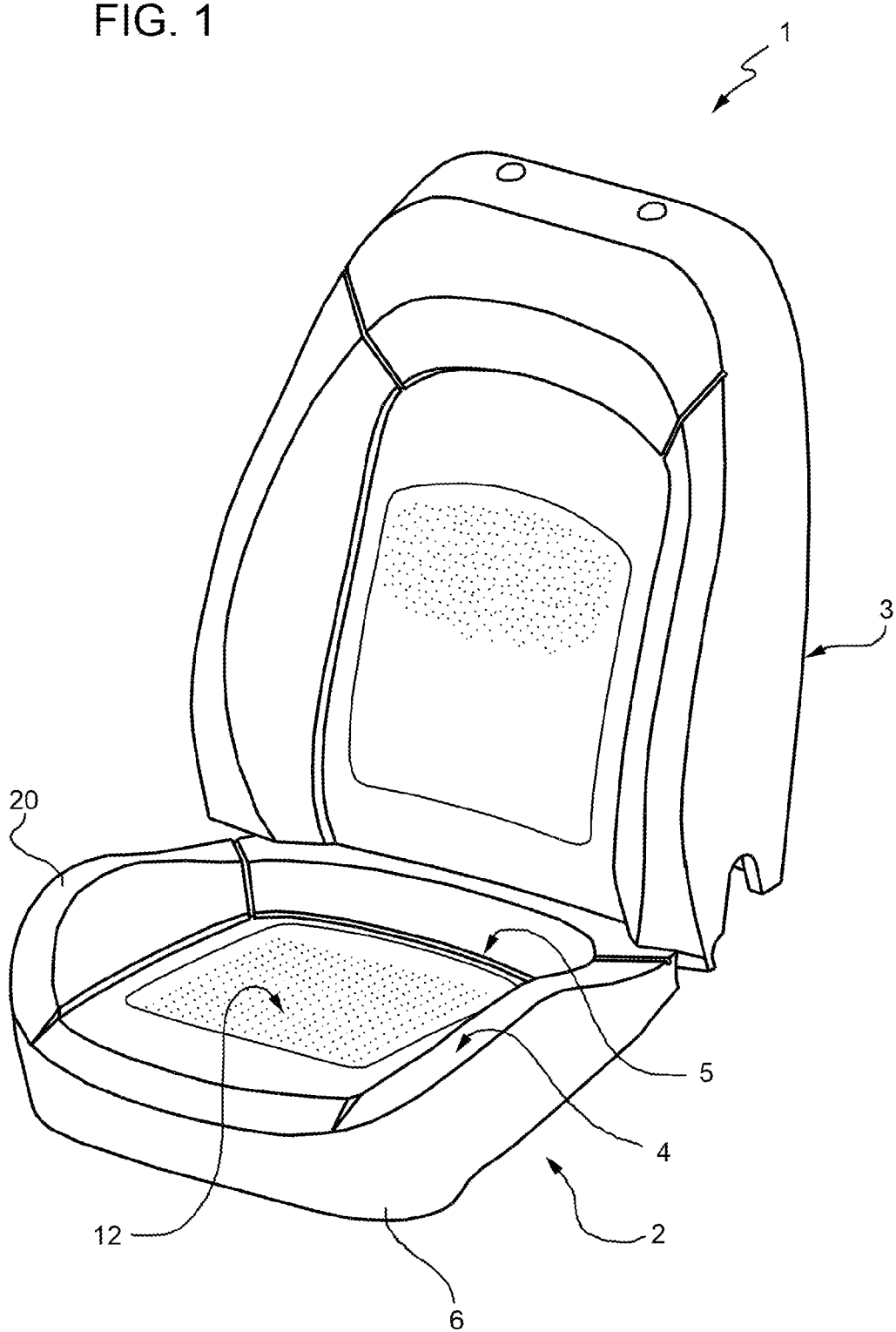
FIG. 1 is a perspective view of a seat for vehicles comprising a preferred embodiment of the seat upholstery covering according to an example.

In FIG. 1, reference numeral 1 designates a seat comprising a squab 2 and a backrest 3, which are both made in a similar manner and so the following treatment, for the sake of simplicity, shall only make reference to the squab 2.

Figure 2:
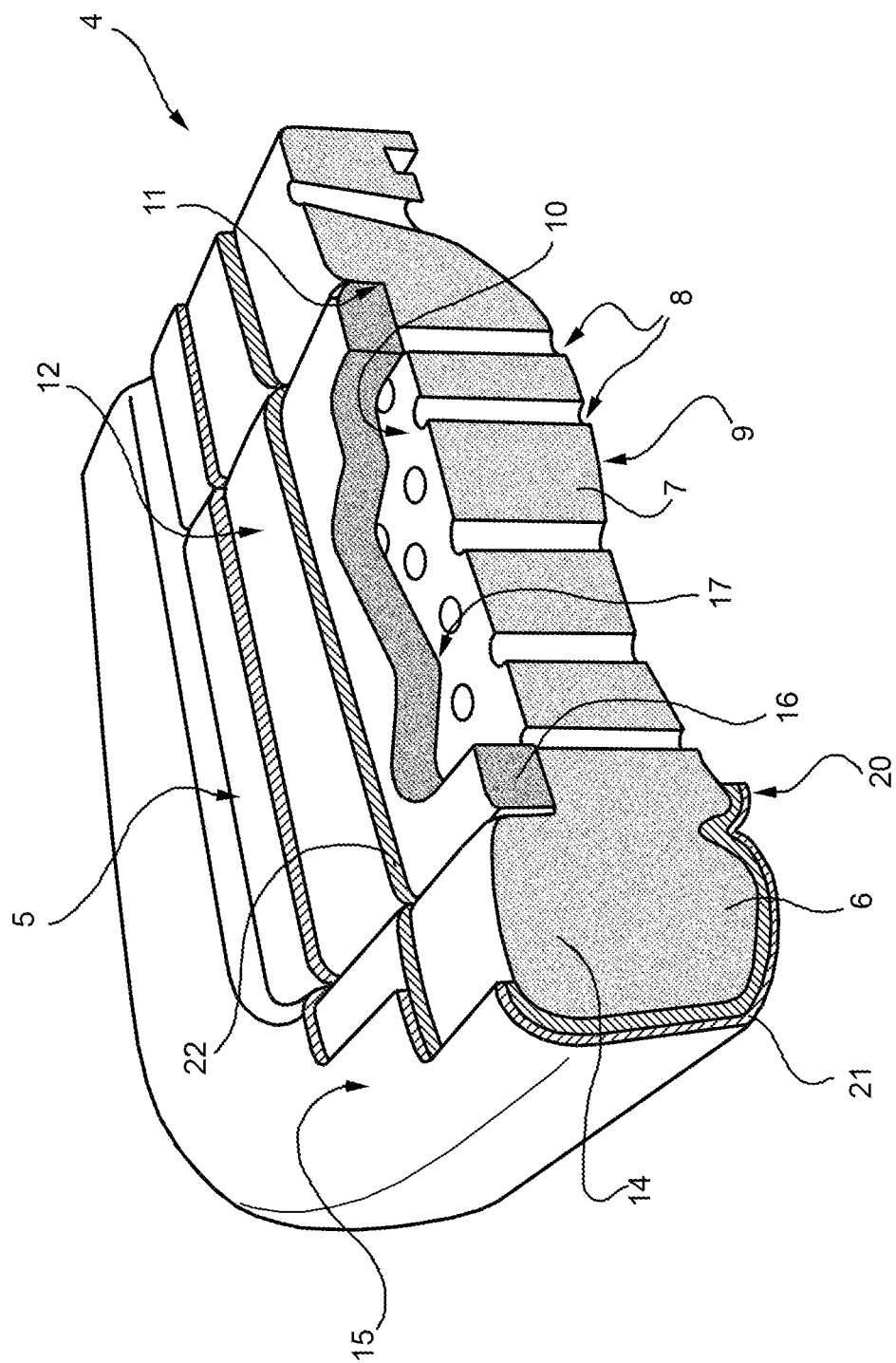
FIG. 2 is an enlarged-scale cutaway view of the seat in FIG. 1.

As is shown in FIG. 2, the squab 2 comprises a support body 4 defining an upper surface 5 shaped to support a user. The support body 4 comprises lower padding 6 that is made of a plastic material foam, in particular a polyurethane foam, is connected to the vehicle in a known manner (not shown), and has adequate rigidity, resistance, elastic and/or density characteristics to support the user's weight and to ensure comfortable support.

The padding 6 comprises an intermediate portion 7 having a plurality of holes 8 that extend along respective, substantially vertical, parallel axes and pass through it from a lower face 9 to an upper face 10 of portion 7. The number, position and transversal section of the holes 8 are determined experimentally, as shall be described in more detail further on, in order to ensure heat dissipation and hence optimal comfort for the support body 4, without compromising the resistance and durability characteristics of the squab 2. For example, the holes 8 are circular with a diameter of approximately 16 mm and there are twenty of them.

Face 10 defines the bottom of a cavity 11 that is located beneath an intermediate zone 12 of surface 5, where greater heat exchange takes place between the user and the squab 2 in use. The cavity 11 has a substantially rectangular shape in plan (for example, with sides of 260×300 mm) and has a substantially constant height or depth (for example, equal to 15 mm). Along the two sides and at the back with respect to the cavity 11, the padding 6 comprises a portion 14 shaped so as to have a peripheral zone 15 of the surface 5 that is raised with respect to the intermediate zone 12.

The cavity 11 is occupied, preferably completely, by an insert (partially shown). The insert 16 has a lower surface 17 that faces the openings of the holes 8 and that, preferably, rests directly against face 10.

The insert 16 has a constant thickness, equal to the depth of the cavity 11, and has characteristics that allow air to pass through and transfer water vapour to the holes 8. In particular, the insert 16 has permeability to the passage of air greater or equal to 39 l/min. Here and in the following, permeability to the passage of air is intended as being measured as the flow of air in liters per minute according to the UNI EN ISO 9237 standard (in detail, blowing air through a test sample, orthogonally to an area of 5 cm$^2$, with a pressure difference of 200 Pa).

Preferably, the material of the insert 16 also has a capacity of water absorption by capillarity greater than 2 mm. Here and in the following, the capacity of water absorption by capillarity is intended as being measured by immersing a test sample for five consecutive hours in a height-graduated container filled with at least 15 mm of water, at an ambient temperature of 20° C. and 50% relative air humidity, and corresponds to the height to which water absorption arrives with respect to the free surface of the water in the container, the test sample being defined by a 300 mm×200 mm rectangular sheet positioned such that the 300 mm side is perpendicular to the bottom of the container.

In particular, the above-indicated limit for the water absorption capacity allows, in the case of the backrest 3, to make the sensation of humidity perceived by the user as even as possible over the entire intermediate zone 12 of the surface 5, avoiding drops of moisture stagnating at the bottom.

According to a first embodiment, the insert 16 is made of open-cell polyurethane foam, having permeability to the passage of air of approximately 45 l/min and a capacity of water absorption by capillarity of approximately 8 mm.

In a second embodiment, the insert 16 is made of a nonwoven fabric of polyester fibers coupled with low-melting polyester fibers, for example in a material with fibers belonging to the family of materials known by the commercial name of ECOTEN (registered trademark). In this way, for example, it is possible to choose an insert having a density of approximately 36.5 kg/m$^3$, permeability to the passage of air of approximately 65 l/min or 39 l/min, and a capacity of water absorption by capillarity of approximately 2 mm or 4 mm.

In a further embodiment, the insert 16 is made of a material known by the commercial name of "3mesh", from Muller Textil GmbH.

The insert 16 and portion 14 are covered by a upholstery covering 20 comprising an outer layer 21 and an inner layer 22, which is defined by a sheet heat-fixed to layer 21, for example by means of a flaming process. In other words, as stated in jargon, the layer 21 is laminated.

Layer 21 is defined by a fabric lining that is normally used in seats currently in production and that has a resistance to heat-exchange such as to impede the passage of heat during the phases of heating and cooling the upholstery covering 20, to render this heating/cooling gradual.

Preferably, layer 22 extends over the entire inner surface of layer 21. Alternatively, layer 22 extends only on parts of the inner surface of layer 21. For example, it could have dimensions so as to cover just the part beneath zone 12.

Layer 22 is in contact with the insert 16. According to an alternative embodiment (not shown), insert 16 is absent. Therefore, upholstery covering 20 directly faces portion 7 of the padding 6. Preferably, there is not any other layer between layer 22 and the openings of holes 8. In particular, cavity 11 is absent and upholstery covering 20 is in contact with portion 7.

Hygroscopicity (or hydrophily) of the layer 22 is obtained by choosing an appropriate porous material, having also good air permeability, in order to absorb water vapour from layer 21 and maintain an acceptable level of comfort, limiting humidity on the surface 5 in contact with the user. The absorbed humidity is then transferred to the holes 8 by means of the transpiration or permeability of layer 22 itself and, if provided, the insert 16.

In particular, the term "hygroscopic" means a body and/or substance able to absorb humidity in the air and that changes in size due to this absorption, while the term "hydrophilic" means a body and/or substance able to absorb humidity in the air without its dimensions changing: for the purposes of examples of the present subject matter, the difference in the meanings between these two terms is considered unimportant.

As an index to check if a material has a sufficient hygroscopicity or hydrophily to be adequate to form the layer 22, a parameter known as "wettability" is evaluated, namely the time needed to completely wet a parallelepipedal test sample with a rectangular base, a volume of between 0.2 and 0.25 dm$^3$ and having a height of at least 15 mm, initially dried and then left to float in a container filled with a quantity of water equal to at least the thickness of the test sample and hence at least 15 mm.

To have acceptable comfort in terms of sensation of heat and sensation of humidity, the material of layer 22 has a wettability of less than or equal to 30 seconds.

Preferably, the material of layer 22 also has a capacity of water absorption by capillarity greater or equal to 15 mm, in order to render the absorption of humidity between the various zones of layer 22 as even as possible.

Preferably, layer 22 also has permeability to the passage of air greater or equal to 95 l/min, to facilitate the passage of air and hence heat exchange between the surface 5 and the holes 8. In particular, once the layers 21 and 22 are fixed together, the upholstery covering 20 has permeability to the passage of air greater or equal to 45 l/min.

In one embodiment, layer 22 has a thickness greater or equal to 3 mm, preferably equal to 6.5 mm.

Figure 3:
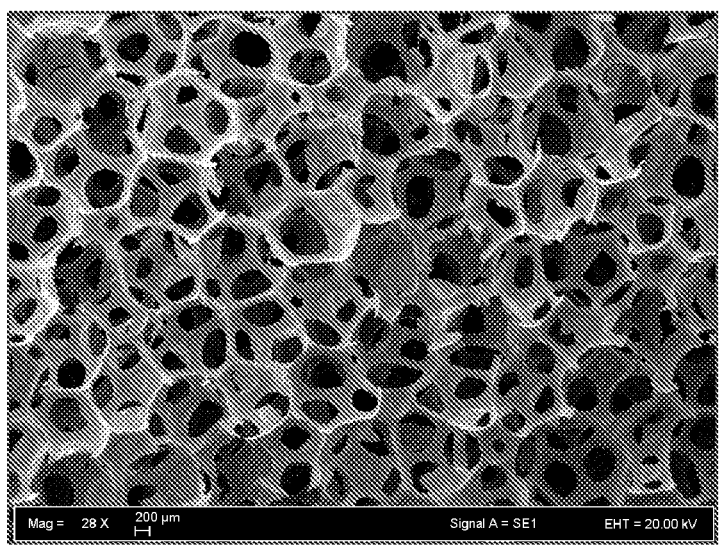
FIG. 3 shows, in an enlarged scale, a polyurethane foam chosen to form a hygroscopic layer of the covering.
Figure 3:
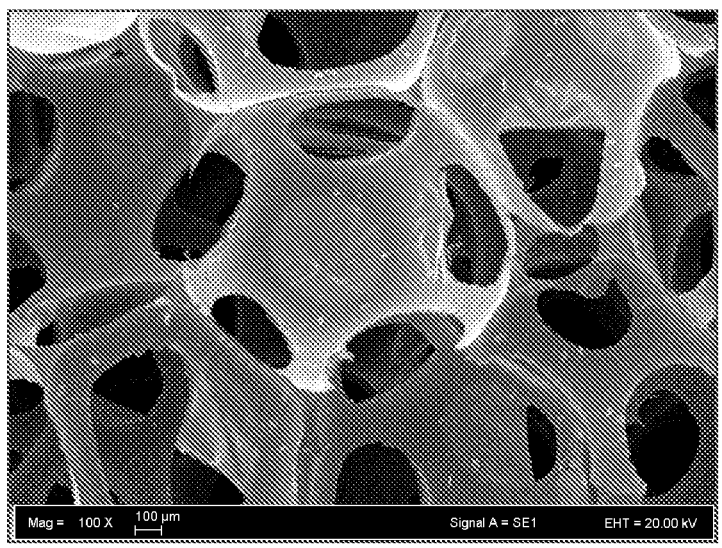

According to an example, as shown in FIG. 3, the material of the layer 22 is made of an open-cell foam. This means that each cell has a plurality of pores that put such cell in communication with the majority of or with all the adjacent cells. In particular, the chosen material is a polyester-based polyurethane foam, which, with respect to a polyether-based polyurethane foam of the same density, has a regular cell structure, substantially constant cell sizes, greater hysteresis and less elasticity (therefore, greater impact absorption) and less resistance to water and heat. When seen under a microscope, the cells have substantially a dodecahedron shape (twelve pentagonal faces).

Besides, according to an example, the open-cell foam of the layer 22 is chosen so as to have a cell mean linear density less than or equal to 15 cell/cm.

Preferably, the open-cell foam of the layer 22 is chosen so as to have cells with a mean diameter higher than 1.1 mm.

With such features, the cells are large enough to have a great capacity of absorbing humidity. In the meantime, when heat-fixing layer 21 to layer 22, the quantity of melted plastic material joining the layers 21,22 is relatively low. Therefore, the permeability of the upholstery covering 20 is obstructed only a little.

For example, the material of layer 22 is defined by a polyester-based polyurethane foam known by the commercial name of WA35, from Toscana Gomma S.p.A., which has a wettability of approximately 10 seconds, a capacity of water absorption by capillarity of approximately 15 mm, a density of approximately kg/m$^3$. Test under the microscope have shown that such material has a cell mean linear density between 10 and 12 cell/cm and that the cells have a mean diameter of 1.255 mm.

With this material and with a thickness of 6.5 mm, layer 22 has permeability to the passage of air of approximately 98 l/min.

As mentioned above, the heat exchange efficiency of the support body 4 also depends on the number, size and positioning of the holes 8 in the padding 6. In particular, the distribution of the holes 8 is not uniform along face 10 and is determined via design and experimental evaluation, which comprises the following steps:
1) a seat is designed and built having solid padding 6, i.e. without holes 8;
2) the zones of the seat where contact pressures are highest for a user or standard dummy are determined by design or experimental testing;
3) the built seat is subjected to an experimental test to define the temperature or heat profile on the support surface of the seat, keeping the seat in a environment of controlled and constant temperature and humidity, in particular an environment at a temperature of 25° C. and 50% relative humidity, and performing the following operations:
   a) the seat is used for one hour, making a user (or standard dummy with outer surfaces heated to 35 ° C.) sit on the support surface of the seat;
   b) the temperature of the support surface is measured and a temperature map is defined by means of a thermographic system;
   c) operations 3a) and 3b) are repeated for a certain number of times (for example, another two times);
   d) a mean heat map is defined, with average temperature values at each point of the support surface, based on the number of thermographic readings taken;
4) the mean heat map is compared with the results of step N° 2, to check that the higher temperature values are positioned in the zones with higher contact pressures, and in the case of a positive outcome, it is deduced that the results of steps N° 2 and 3 are reliable;
5) the number and size of the holes 8 to be made in the padding are defined beforehand (for example, twenty holes with a diameter of 16 mm), without excessively decreasing the padding's characteristics of flexibility, resistance, carrying capacity, etc.;
6) the positions of the holes 8 are chosen by arranging the openings of the holes 8 in the padding in correspondence to the points that are marked by the highest temperature values on the mean heat map;
7) the operations of step N° 3 are repeated with the seat having perforated padding;
8) the new mean heat map is compared with the previous one to check the outcome of the choice made in step N°6.

On the basis of what stated above, the advantages are evident from the choice the material of layer 22. In particular, the upholstery covering 20 favours the passage of air and hence heat exchange and the transfer of water vapour from the surface 5 to the outside via the holes 8, especially in stationary conditions, even when the layers 21 and 22 are heat-fixed. At the same time, layer 22, thanks to its own hygroscopic/hydrophilic capacity, and without active carbons in the polyurethane foam, frees the surface 5 of humidity.

The humidity is easily transferred to the holes 8 thanks to the transpiration of layer 22, conferred by the pores of each cell of its material, so that the user's perceived sensation is improved with respect to known solutions.

As a comparison, in the prior art the foam normally used in the marker under the fabric layer 21 is a foam having partially closed cells and with a cell mean linear density equal to about 20 cell/cm. Therefore, the differences of the material chosen according to an example of the present subject matter for the layer 22 are evident.

With regards to thermal comfort, through experimental tests carried out with a "perspiring" dummy, sufficient heat exchange (approximately 70 W/m$^2$) and evaporative exchange to avoid perspiration forming on the human body were detected.

In particular, the dummy used in the tests has an anthropomorphous shape, basically comprising a back and a base and has a series of surface inserts that simulate human skin to reproduce the human body and thermoregulation system. The dummy is positioned on the seat under test so that dummy's weight generates realistic pressure on the backrest and the squab. Measurement of the transfer of heat and water vapour takes place under controlled environmental conditions, while keeping the dummy at a constant temperature of 35° C. and at a fixed rate of perspiration, set via an electronic control system. The heat energy and the water vapour dissipated by the dummy represent a direct estimate of the thermal conductivity and permeability of the seat's backrest and squab.

Finally, it is clear that various modifications and variants can be made to the upholstery covering 20 and to the seat described above with reference to the enclosed figures without leaving the scope of protection of the present invention, as defined in the enclosed claims.

In particular, when provided, the cavity 11 and the insert 16 could have a different shape and/or incorporate one or more sensors, placed in positions that do not interfere with the openings of the holes 8 on face 10.

The invention claimed is:

1. A seat upholstery covering for vehicles comprising:
   a fabric layer defining a support surface for a user, and
   a hygroscopic layer fixed to said fabric layer on a face opposite to said support surface; the material of said hygroscopic layer being an open-cell polyurethane foam having a cell mean linear density less than or equal to 15 cell/cm;
   wherein said layers are joined by melted plastic material heat-fixing said hygroscopic layer to said fabric layer, and
   wherein the cells of the foam of said hygroscopic layer have a dodecahedron shape.

2. The seat upholstery covering according to claim 1, wherein the material of said hygroscopic layer has a cell mean linear density between 10 and 12 cell/cm.

3. The seat upholstery covering according to claim 2, wherein said hygroscopic layer has a density of approximately 35 kg/m3.

4. The seat upholstery covering according to claim 1, wherein said hygroscopic layer has a permeability to the passage of air greater or equal to 95 l/min.

5. The seat upholstery covering according to claim 4, wherein the seat upholstery covering has a permeability to the passage of air greater or equal to 45 l/min, once said layers have been fixed together.

6. The seat upholstery covering according to claim 1, wherein the material of said hygroscopic layer is an open-cell polyester based polyurethane foam.

7. The seat upholstery covering according to claim 1, wherein the cells of the foam of said hygroscopic layer have a mean diameter higher than 1.1 mm.

8. The seat upholstery covering according to claim 1, coupled to
a padding made of a plastic material foam and comprising an intermediate portion having a plurality of through holes.

9. The seat upholstery covering according to claim 8, wherein said upholstery covering directly faces said intermediate portion.

10. The seat upholstery covering according to claim 8, wherein said upholstery covering is in contact with a permeable insert, which is housed in a cavity of said padding and is in contact with said intermediate portion.

11. The seat upholstery covering according to claim 8, wherein a distribution of said holes in said padding is not uniform.

12. The seat upholstery covering according to claim 11, the seat upholstery covering made by a process comprising determining the distribution of a plurality of through holes in the padding of a seat body, the determining comprising the steps of:
providing a seat body comprising:
a) The padding including a solid plastic material foam, and
b) The upholstery covering;
measuring the temperature of the support surface of the fabric layer of the upholstery covering under conditions of use;
the temperature measuring step comprising the operations of:
a) keeping said seat body in an environment of controlled and constant temperature and humidity;
b) using said seat body, by making a user or a dummy sit on said support surface for a preset time;
c) measuring the temperature after use, by means of a thermographic measurement system so as to define a heat map of said support surface; and
positioning the openings of said holes in said padding at the points marked by the highest temperatures.

13. The seat upholstery covering according to claim 12, comprising the steps of:
determining the seat zones where the contact pressures are highest for a user or a standard dummy; and
checking that the highest measured temperature values are located in the zones with the highest contact pressures.

14. A seat body comprising:
a padding made of a plastic material foam and comprising an intermediate portion having a plurality of through holes, wherein the padding includes solid plastic material foam, and wherein the distribution of said holes is made by the process comprising the steps of:
measuring the temperature of the support surface of the fabric layer of the upholstery covering under conditions of use, comprising:
a) keeping said seat body in an environment of controlled and constant temperature and humidity;
b) using said seat body, by making a user or a dummy sit on said support surface for a preset time; and
c) measuring the temperature after use, by means of a thermographic measurement system so as to define a heat map of said support surface; and
positioning the openings of said holes in said padding at the points marked by the highest temperatures, wherein a distribution of said holes in said padding is not uniform; and
upholstery covering for vehicles comprising:
a fabric layer defining a support surface for a user, and
a hygroscopic layer fixed to said fabric layer on a face opposite to said support surface; the material of said hygroscopic layer being an open-cell polyurethane foam.

15. The seat body according to claim 14, wherein said upholstery covering directly faces said intermediate portion.

16. The seat body according to claim 14, wherein said upholstery covering is in contact with a permeable insert, which is housed in a cavity of said padding and is in contact with said intermediate portion.

17. The seat body according to claim 14, wherein the distribution of said holes is made by the process comprising the steps of:
determining the seat zones where the contact pressures are highest for a user or a standard dummy; and
checking that the highest measured temperature values are located in the zones with the highest contact pressures.

18. The seat body according to claim 14, wherein the material of said hygroscopic layer has a cell mean linear density less than or equal to 15 cell/cm.

19. The seat body according to claim 14, wherein said layers are joined by melted plastic material fixing said hygroscopic layer and to said fabric layer.

* * * * *